United States Patent [19]

Resch

[11] Patent Number: 4,726,629
[45] Date of Patent: Feb. 23, 1988

[54] HYDRAULIC BRAKE-POWER BOOSTER UNIT

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 847,442

[22] Filed: Apr. 2, 1986

[30] Foreign Application Priority Data

Apr. 2, 1985 [DE] Fed. Rep. of Germany ....... 3511975

[51] Int. Cl.$^4$ .............................................. B60T 8/88
[52] U.S. Cl. ...................................... 303/92; 60/534; 303/DIG. 4
[58] Field of Search .......................... 60/534, 545, 551; 303/92, 103, 110, 114, DIGS. 1–4

[56] References Cited

U.S. PATENT DOCUMENTS

| | | | |
|---|---|---|---|
| 3,671,082 | 6/1972 | Stevens | 303/DIG. 4 |
| 3,790,225 | 2/1974 | Wehde | 303/DIG. 3 |
| 3,871,718 | 3/1975 | Würth | 303/DIG. 3 |
| 3,948,568 | 4/1976 | Leiber | 303/DIG. 4 |

FOREIGN PATENT DOCUMENTS

| | | |
|---|---|---|
| 2249007 | 4/1974 | Fed. Rep. of Germany 303/DIG. 4 |
| 3015689 | 10/1981 | Fed. Rep. of Germany . |
| 3237959 | 5/1983 | Fed. Rep. of Germany . |

*Primary Examiner*—Duane A. Reger

*Attorney, Agent, or Firm*—Barnes & Thornburg

[57] ABSTRACT

A hydraulic brake-power booster unit is provided for a vehicle having a dual-circuit brake system and an antilock system operating according to the drain principle. When the brake system is intact, the booster unit provides dynamic pressure to one of the two brake circuits and static pressure admission to the other. The pressure to the static brake circuit takes place by the separate-power-assisted shifting of an emergency piston. On one side, the emergency piston delimits an output pressure space to which the brake circuit that can be statically acted upon by pressure is connected. This brake circuit also remains operable in the case of a breakdown of the hydraulic power source only by the operation of the pedal and the resulting possible shifting of the emergency piston. A path transducer generates an electrical signal proportional to the position of the emergency piston. A pressure transducer generates an electrical signal proportional to the pressure in the output pressure space for the static brake circuit. Starting from a minimum position of the emergency piston, the brake circuit that initially could be acted upon statically by pressure is now acted upon dynamically. The reversing is caused by a mechanically path-controlled reversing valve. When the actual value of the output pressure of the brake-power booster unit is lower than a desired value, an electronic comparison arrangement generates a warning signal.

8 Claims, 3 Drawing Figures

HYDRAULIC BRAKE-POWER BOOSTER UNIT

BACKGROUND AND SUMMARY OF THE INVENTION

This invention relates to a hydraulic brake-power booster unit for a vehicle having a dual-circuit brake system that is also equipped with an antilock system, and having separate power sources connected to separate proportional control valves for supplying pressure to each brake circuit. One of the proportional control valves is equipped with an emergency piston such that in the case of a power source failure, only the movement of the emergency piston, via the brake pedal, can be utilized to build up an output pressure for the corresponding brake circuit.

A hydraulic brake-power booster unit of this type is known from German Unexamined Published Application No. 30 15 689.

The known brake-power booster unit consists essentially of two proportional control valves arranged in a joint housing that are each assigned to a brake circuit of the motor vehicle brake system. These proportional control valves are developed as sliding valves that each have a valve piston or slider that is arranged in a prolate housing bore so that it can be slid in a pressure-sealed way. The valve piston or slider supports itself at an actuating member that can be slid back and forth by the actuating of the brake pedal by means of an elastic element acting as a path simulator, such as a rubber buffer or a helical pressure spring.

The piston of such a proportional control valve has an outer ring groove, one groove flank of which forms a control edge that, in the introductory phase of a braking process, travels more or less beyond an input duct to which the assigned hydraulic brake force source is connected. The distance travelled by the groove flank corresponds to the value of the pedal force. Due to this movement, an output pressure space of the proportional control valve itself is connected with the input duct via an axial bore of the valve piston and a radial bore which communicates with the ring groove of the valve piston. Thus, the respective brake circuit is dynamically acted upon, i.e., it is acted upon by a pressure that is derived from the output pressure of the outside power source.

By means of the pressure existing in the output pressure space of the respective proportional control valve, the valve piston is pushed back. In the state of equilibrium of the piston, i.e., when the output pressure corresponds to the expected value corresponding to the actuating force, this results in the closing again of the input duct.

In the normal position of such a proportional control valve corresponding to the unbraked state, the central duct of its piston communicates via another transverse duct with a balancing space that is connected with the brake-fluid storage tank of the brake system. The central duct is closed off on the actuating side by a piston flange of a valve piston. A self-supporting spring positioned against this piston flange forces the valve piston into its normal position. Path-simulating spring elements are arranged between these piston flanges and the actuating member of the brake-power booster unit that can be shifted by the actuating of a pedal.

In the case of the known brake-power booster unit a third housing bore is arranged in parallel between the parallel housing bores receiving the valve pistons of the proportional control valves. A so-called emergency piston, that is sealed off with respect to this housing bore, is slidably arranged in this third housing bore. This emergency piston is arranged between an input pressure space, that is connected with the output pressure space of one of the two proportional control valves, and an output pressure space, that is delimited by a section of the central housing bore. The output pressure space is connected to one of the two brake circuits, such as the front-axle brake circuit, of the vehicle.

The emergency piston has a central longitudinal through-bore, the mouth edge of which on the side of the input pressure space forms the valve seat for a ball valve. The valve body of the emergency piston is forced into the open position of this valve by means of a helical pressure spring supporting itself at the emergency piston. In addition, a piston flange, that on one side delimits the input pressure space, is guided in a pressure-sealed manner in the central bore. The piston flange is rigidly connected with the actuating member of the brakepower boosting unit and is therefore coupled with the brake pedal with respect to movement.

When the outside power source is intact, the two brake circuits connected to the known brake-power booster unit are dynamically acted upon via the proportional control valves. The ball valve of the emergency piston, that carries out the movements of the actuating member of the brake-power booster unit remains open because the emergency piston on both sides, is acted upon by the output pressure of one of the proportional control valves.

In the case of a failure of the hydraulic outside power source, (at least for that brake circuit having a proportional control valve connected to the input pressure space delimited on one side by the emergency piston), and upon an actuating of the brake system, the ball valve of the emergency piston changes into its closed position. As a result, the output pressure space that is delimited by the emergency piston is closed off with respect to the input pressure space.

In this situation, the emergency piston acts like a "normal" master brake cylinder piston, the shifting of which causes brake pressure to build up in the output pressure space. The emergency piston is provided so that the pressure accumulators in the outside pressure source can be kept as small as possible while ensuring that even after a breakdown of the pump, when accumulators become exhausted, braking can still take place with the legally required minimum vehicle deceleration.

However, it is a disadvantage in the case of the above known brake-power booster unit that the tightness of the ball valve required for the operability of the emergency piston during the driving operation of the vehicle can no longer be practically tested because it exercises its closing function only in the case of a breakdown of the outside power source. Corrosion and dirt related leaks of this ball valve, the statistical frequency of which under raised safety conditions cannot be neglected, as such conditions cannot be recognized by the system. Therefore, a situation of considerable potential danger results, especially in the case of a failure of the accumulator charge pumps when the accumulating capacities are relatively small.

It is therefore an objective of the invention to improve a brake-power booster unit of the above-mentioned type to the extent that a faulty situation resulting in the ineffectiveness of the emergency brake system comprising the emergency piston can be reliably recognized and prevented.

According to the invention, this and other objectives are achieved by a brake-power booster unit dynamically acts upon only one brake circuit, whereas the other brake circuit is braked statically. In the case of a vehicle having a front-axle/rear-axle brake-circuit division, the rear-axle brake circuit is the dynamically acted upon circuit, i.e., it can be acted upon by the output pressure of a proportional control valve that can be actuated via a path simulator. The front-axle brake circuit is braked statically, in which case the brake pressure for the front-axle brake circuit is built up in an output pressure space that is delimited on one side by the emergency piston of the brakepower booster unit.

The proportional control valve for this statically acted upon brake circuit is integrated into the emergency piston and generates an output pressure that acts on its working surface. The piston of the proportional control valve, developed as a slider, is an extension of an auxiliary piston that is movably coupled with the brake pedal.

In the case of a breakdown of the pumps of the outside power source, the auxiliary piston supports itself directly at the emergency piston. In this way, brake pressure can be built up in the output pressure space assigned to the front-axle brake circuit by pedal force.

The shifting path of the emergency piston is monitored by a path transducer. The pressure at the output of the output pressure space of the brake-power booster unit, that is delimited by the emergency piston, is monitored by a pressure transducer. These output signals of the path transducer and of the pressure transducer are fed to an electronic comparison unit. If this pressure does not correspond to the desired value associated with the respective position of the emergency piston, the electronic comparison unit generates a warning signal. By means of the warning signal, it is recognized that the shifting path of the emergency piston is too large compared with the acquired value of the output pressure. By means of this monitoring, all statistically important cases of malfunctioning or danger situations can be recognized in time and preventative maintenance measures can be initiated.

It is also an advantage that no valve is required that is susceptible to failure corresponding to the ball valve of the known brake-power booster unit. A further advantange is that because of the integration of one of the two proportional control valves into the emergency piston, the brakepower booster unit can also be constructed with advantageously small radial dimensions resulting in favorable installation conditions.

In the case of the preferred development of the brakepower booster unit according to the invention including a reversing valve which permits flow from the supply unit to an assigned brake circuit, the brake circuit that is normally statically acted upon by pressure, starting from a certain position of the emergency piston, is dynamically acted upon by pressure. As a result, in the case of a long-lasting braking that may lead to vapor lock, more brake fluid can be fed in. Thus, the emergency piston practically remains stationery. Also, it is ensured that after a pressure reduction phase of the antilock control, the brake circuit cannot be "controlled to be empty", and that for a possibly required subsequent emergency braking, a sufficient shifting path is still available for the emergency piston.

The switching of the brake circuit, from a static to a dynamic operation by means of the emergency piston, may take place by coupling the output pressure of the assigned pressure accumulator to the output pressure space assigned to this brake circuit.

The development of the brake-power booster unit according to the invention includes a reversing valve connecting the power source to the output pressure space via an anti-cavitation space.

The switching of the brake circuit that can be acted upon by pressure by the shifting of the emergency piston from this static to the dynamic operation can be controlled electrically, i.e. by means of an electromagnetic valve that is controlled by means of the path transducer. However, it is more advantageous if, as provided according to claim 4, a mechanically actuable reversing valve is provided. In which case, the piston stroke of this valve is monitored by means of the path transducer. This construction results in a simpler and more cost-effective construction and facilitates a constructional integration of the reversing valve into the brake-power booster unit.

Other objects, advantages and novel features of the present invention will become apparent from the following detailed description of the invention when considered in conjunction with the accompanying drawings.

DETAILED DESCRIPTION OF THE DRAWING

Figure 1:
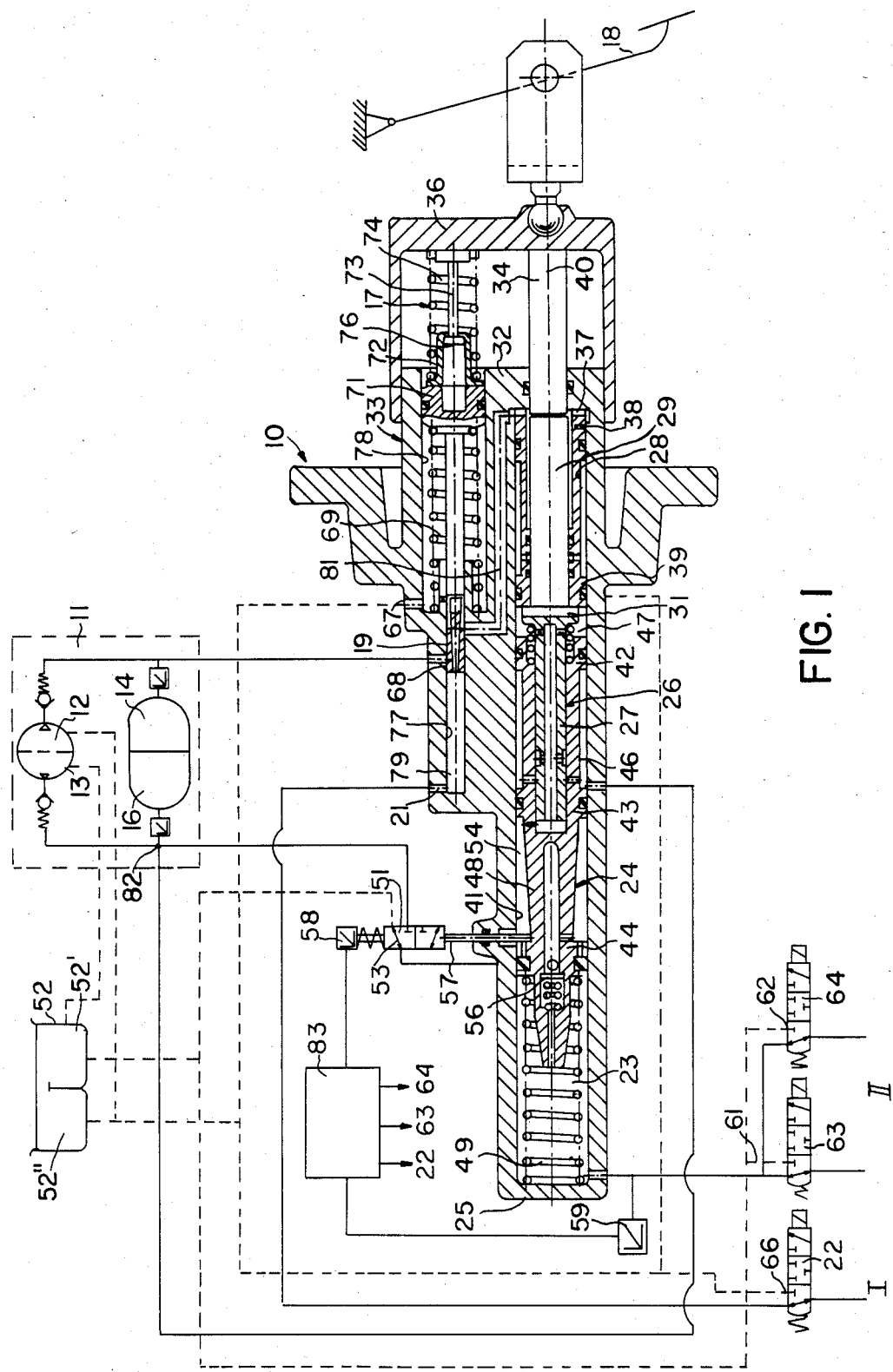
FIG. 1 is a diagrammatic view of a brake-power booster unit for a vehicle with a lock-protected dual-circuit brake system and an antilock system according to a preferred embodiment of the invention.

The brake-power booster unit according to the invention shown in the drawing, is operated by hydraulic power. The power source 11 comprises two hydraulic pressure supply circuits each with one pump element 12 and 13 respectively and a pressure accumulator element 14 and 16 that is connected to the respective pump element 12 and 13. The two pump elements 12 and 13, as shown in diagram form in the drawing, may be combined to be one single pump unit. Similarly, the two accumulator elements 14 and 16 may also be combined into one structural unit.

Figure 2:
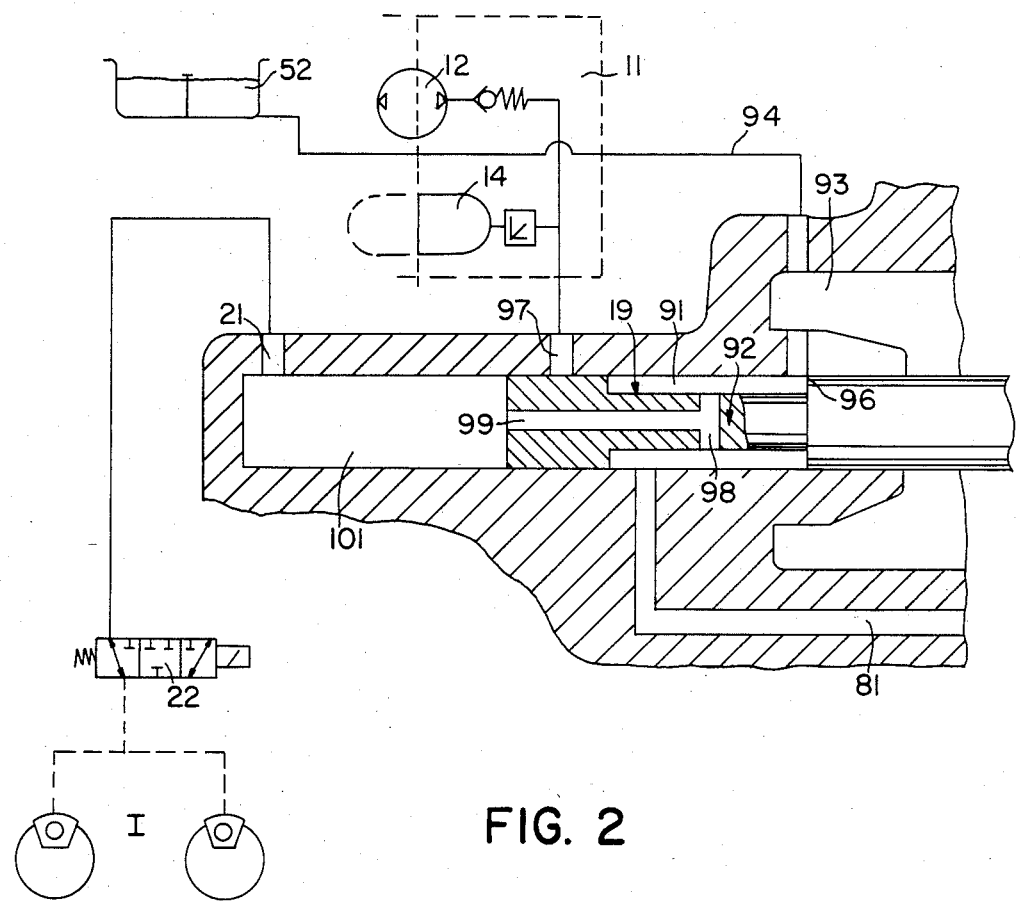
FIG. 2 is a partial exploded view of a first proportional control valve from FIG. 1.
Figure 3:
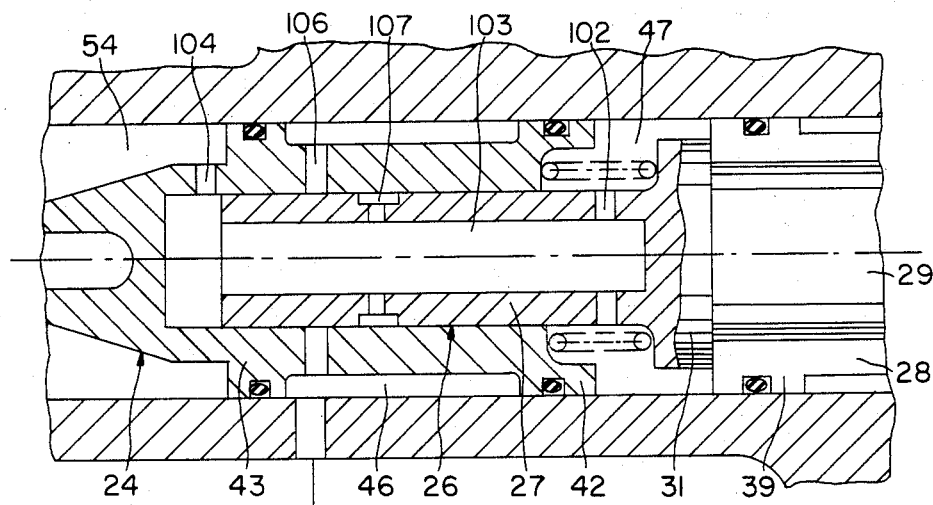
FIG. 3 is a partial exploded view of proportional control valve 26 from FIG. 1.

Within the scope of the brake-power booster unit 10, a first proportional control valve 19 is provided that can be controlled by the actuating of the brake pedal 18 via a path simulator 17. The output pressure of one pressure supply circuit, which is formed by one pump element 12 and the accumulator element 14 assigned to it, is also coupled into the first proportional control valve 19. The output pressure supplied at the output 21 of this proportional control valve 19 acts on the one brake circuit I of a vehicle (not otherwise shown) having a hydraulic dual-circuit brake system. The pressure available to output 21 and output 81 from the first proportional control valve 19 is the either the reservoir 52 via 94, 93 and 96 or the accumulator 14 via 19 depending upon the position of the first proportional control valve 19 as illustrated in FIG. 2.

The dynamically operated brake circuit I would, in the case of a vehicle with front-axle/rear-axle brake circuit division, generally be the rear-axle brake circuit.

The brake pressure in this brake circuit I can, as shown by a brake-pressure control valve 22, be subjected to an antilock control which, in the case of the selected explained example, operates according to the drain principle. The operation of such an antilock control may be assumed to be known.

The other brake circuit II, which in the case of the chosen explained example is the front-axle brake circuit, is acted upon by the static output pressure of an output pressure space 23 that is supplemented by the power-assisted shifting of a piston 24. This piston 24 will also be called an "emergency piston" because of its function in the case of a malfunction. The type of actuation provided for this piston is further developed and described in detail in the following.

The output pressure space 23 is delimited on one side by an end front wall 25 of the brake-power booster unit housing 33 and on the other side by the emergency piston 24. When the power source is intact, the emergency piston 24 can be shifted with power-assistance. In the case of a breakdown of the power source, the emergency piston 24 can be shifted only by the actuation of the brake pedal 18, to build up a pressure in the output pressure space 23. Another proportional control valve 26 is integrated into this emergency piston, that is known per se. The slider 27 of this proportional control valve 26 is developed as a rod-shaped extension of an auxiliary piston 29 that is led through a separating piston 28. The auxiliary piston 29, which is developed as a ring piston, passes through a central bore of the separating piston 28 and is sealed off with respect to the separating piston 28. The auxiliary piston 29 is equipped with a centrally located radial flange 31 at which the separating piston 28 can support itself.

A working pressure space 37 is delimited in the axial direction by the separating piston 28 and an end front wall 32 pedal side of the brake-power booster unit housing 33. The pressure rod part 34 of the actuating member 36 of the brake-power booster unit 10 that is coupled with the brake pedal 18 passes through this portion of the end front wall 32. The output pressure of the first proportional control valve 19, which can be controlled via the path simulator 17, can be coupled into the working pressure space 37 via 81. The separating piston 28 is a ring piston with two piston flanges 38 and 39 arranged at an axial distance from one another. These flanges 38 and 39 are sealed off with respect to the main bore 41 of the booster unit housing 33, which main bore has a central axis 40.

The emergency piston 24 has a total of three piston flanges 42, 43 and 44 that are arranged at an axial distance from one another and themselves are sealed off with respect to the main bore 41 of the brake-power booster unit housing 33. By means of the center flange 43 and the flange 42 of the emergency piston 24 adjacent to the separating piston 28, an annulus or pressure space 46 is delimited in the axial direction. The output pressure of the other pressure supply sub-unit 13, 16 of the power source is permanently coupled into this pressure space 46. This ring-cylindrical pressure space 46 forms the input pressure space of the second proportional control valve 26.

The output pressure space 47 of this second proportional control valve 26 is delimited in axial direction by means of the end flanges 42 of the emergency piston 24, shown on the right in the drawing, and the flange 39 of the separating piston 28 that is facing it.

Between its center piston flange 43 and its piston flange 44, shown on the left in the drawing, the emergency piston 24 has a conically tapering section 48, the diameter of which decreases in the direction of the left flange 44 of the emergency piston 24. The left flange 44 delimits the output pressure space 23 of the brake-power booster unit 10 assigned to the brake circuit II. The emergency piston 24 together with the auxiliary piston 29 and the separating piston 28 are forced into the shown normal position by means of a prestressed pressure spring 49.

In this normal position of the pistons 24, 28 and 29 of the brake-power booster unit 10, a mechanically actuable reversing valve 51, that is developed as a 3/2-way valve in the shown embodiment, is directed into its shown normal position I. Via a flow-through path 53 of this reversing valve 51, the brake fluid storage tank 52, communicates with the annulus 54, that in axial direction is delimited by the left flange 44 and the center flanges 43 of the emergency piston 24. The annulus 54 acts as an anti-cavitation space that communicates with the output pressure space 23 of the brake-power booster unit 10 via the central valve 56. According to a known construction, central valve 56 is open in the normal position of the emergency piston 24.

The reversing valve 51 is developed as a sliding valve that can be actuated by means of a tappet 57 supporting itself at the conical part 48 of the emergency piston 24. The piston or slider of the reversing valve 51 with the tappet 57, is forced into the normal position described above by a restoring spring.

A path transducer 58 is coupled with the tappet 57 or the slider of the reversing valve 51. The path transducer 58 generates an electric output signal that is proportional to the position of the tappet 57 or the position of the emergency piston 24 detected by the shifting of the tappet 57. A pressure transducer 59 is also provided that registers the pressure generated in the output pressure space 23 of the brake-power booster unit 10. This pressure transducer 59 may either be an analog-device that generates an electric output signal proportional to the pressure in the brake circuit II or the pressure in the output pressure space 23, or a digital device that generates an electrical output signal when the pressure in the output pressure space 23 reaches or exceeds an indicated threshold value.

The brake fluid storage tank 52 is a dual-chamber tank, one chamber 52' of which is connected to the reversing valve 51 as well as to the return-motion outputs 61 and 62 of the brake-pressure control valves 63 and 64 of the antilock system assigned to the brake circuit II. The other chamber 52' is connected to the return-motion output 66 of the brake pressure control valve 22 assigned to the brake circuit I as well as to the return-motion connection 67 of the first proportional control valve 19.

In the shown normal position of the first proportional control valve 19 that can be actuated via the path simulator 17, its slider 68 is forced, by a restoring spring 69, against a captive shell 72 that is fixed by means of head bolt 73 to the actuating member 36 of the brake-power booster unit 10. The captive shell 72 is held in contact with the head 76 of the head bolt 73 by the path-simulation spring 74. The restoring spring 69 supports itself on one side at the housing 33 of the brakepower booster unit 10 and on the other side at a flange 71 that is fixed at the slider.

The coaxial housing bores 77 and 78, in which the slider 68 of the first proportional control valve 19 and the flange 71 of the slider 68 are guided, extend along an axis 79 that is parallel to the longitudinal axis 40 of the main bore 41. As a result, an advantageously space-saving construction of the brake-power booster unit 10 is achieved.

The brake-power booster unit 10 that was explained above by means of its constructional characeristics operates as follows.

Upon actuating the brake pedal 18, a pedal-force-proportional output pressure is generated in the output pressure space 77 of the first proportional control valve 19. In the shown normal position of the brake-pressure control valve 22, this output pressure is coupled into the brake circuit I—the rear-axle brake circuit of the vehicle. The output pressure generated in the output pressure space 77 of the first proportional control valve 19, is also coupled into the working pressure space 37 of the brake-power booster unit 10 via a connecting duct 81 provided at the housing 33 of the brake-power booster unit 10. Thus, the separating piston 28 and the auxiliary piston 29, having a combined surface that corresponds to the cross-sectional surface of the main bore 41, is acted upon by the output pressure of the first proportional control valve 19.

The reaction force exerted on the pressure rod 34 that corresponds to the product of its cross-sectional surface times the output pressure of the first proportional control valve 19 is coupled into the working pressure space 37.

By means of the shifting of the slider 27 of the second proportional control valve 26, resulting from the actuating of the pedal and the admission of pressure to the working pressure space 37, a pressure is now generated in its output pressure space 47 that is also proportional to the pedal force. By means of this pressure in the output pressure space 47, the emergency piston 24 is acted upon with a surface that corresponds to the cross-sectional surface of the main bore 41. As a result, the emergency piston 24 is, according to the drawing, moved to the left causing a pressure buildup in the output pressure space 23 of the brake-power booster unit 10 assigned to the brake circuit II.

The cross-sections of the main bore 41 and of the pressure rod part 34 as well as the prestressing of the path simulation springs 74 are adapted to one another in such a way that during normal disturbance-free functioning of the brake-power booster unit 10 including the power source 11, the emergency piston 24 as well as the auxiliary piston 29 and the ring piston 28 "move ahead" of the movement of the pressure rod 34. That is, during normal operation, this pressure rod 34 does not support itself at the auxiliary piston 29.

When a pressure reduction occurs in the brake circuit II, resulting in the enlargement of the shifting path of the emergency piston 24, the reversing valve 51 will move into its operating position II. A pressure reduction could occur, for example, because the antilock control is operating according to the drain principle, or because the pressure rise in this brake circuit II, is less than what would normally correspond to the piston path due to vapor lock. When reversing valve 51 is in position II, the pressure at the output 82 of the pressure supply sub-unit 13, 16 assigned to the brake circuit II is now coupled into the annulus 54. From here, the pressure at the output 82 is also coupled into the output pressure space 23 of the brake-power booster unit 10 via the sealing collar 44 of the emergency piston 24 acting as a check valve. Brake fluid can also overflow into the output pressure space 23 via the central valve 56. The brake circuit II, which in the normal case is statically acted upon by pressure, will now be acted upon dynamically. Thus, the emergency piston 24 in its functional connection with the reversing valve 51 acts as a proportional control valve. Due to this dynamic action upon the brake circuit II, the output pressure in the output pressure space 23 is maintained at the expected value corresponding to a certain position of the path simulator 17.

From the comparison of the values of the pressure in the output pressure space 23 registered by the pressure transducer 59 with desired values according to the output signal of the path transducer 58, an electronic comparison arrangement 83 (shown only in diagram form) will determine whether the actual pressure value coincides with the desired value to be expected according to the output signal of the path transducer 58. If the actual value and the desired value do not coincide within tolerable limits, the electronic comparison arrangement 83 will generate a warning signal that indicates that an emergency operation of the brake-power booster unit 10, is only possible through the mechanical actuating of the emergency piston 24 via the pressure rod 34. Such a situation could arise due to a breakdown of both pump elements 12 and 13 of the power source 11 or the exhaust of the accumulator elements 14 and 16.

The different types of malfunctioning that can occur will now be discussed in detail in the following:

1. Breakdown of the part of the power source 11 assigned to the brake circuit II, such as breakdown of the pump element 13 and/or exhausting of the pressure accumulator element 16:

Both brake circuits I and II can still be braked with separate power, however, at brake circuit II the antilock control can no longer be maintained to an unlimited extent because no afterfeeding of pressure is possible from pump element 13 and/or pressure accumulator element 16. In the course of the antilock controlling, the emergency piston 24 moves increasingly into its end position (on the left according to the drawing). When the end position is reached, a buildup of pressure is no longer possible; only a reduction of pressure will occur until there is absolutely no pressure in the brake calipers of brake circuit II. However, in the other brake circuit I, the braking function with the brake-power boosting as well as the antilock control function are fully maintained.

2. Leakage in a part of the brake circuit II that communicates with the output pressure space 23 of the brake-power booster unit 10:

The emergency piston 24 moves to the left changes over into its end position. The ability to brake of the brake circuit I, including the antilock control function in this brake circuit, is fully maintained.

3. Breakdown of the pressure supply for the brake circuit I, due to a malfunctioning of the pump element 12 and/or exhausting of the pressure accumulator element 14:

Braking with boosting and antilock control function is fully maintained in the brake circuit II since the second proportional control valve 26 is actuated by means of the pedal 18 via the slide rod 34 and the auxiliary piston 29. Therefore a pressure proportional to the pedal travel is built up in the output pressure space 47 of the second proportional control valve 26. As a result, the emergency piston 24 can be shifted to cause a pressure buildup in the output pressure space 23. In this case, the ring-shaped separating piston 28 is at the same time, forced into its rear end position and remains stopped in this position.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulic brake-power booster unit for a vehicle having a dual-circuit brake system, that is also equipped with an antilock system that operates according to the drain principle, and having two hydraulic separate power sources individually assigned to the two brake circuits, one of said separate power sources being connected to the input of a first proportional control valve that is actuated via a path simulator and is developed as a sliding valve, the output pressure of said first proportional control vavle can act upon the pressure in one brake-circuit, the other one of said separate power sources being connected to the input of a second proportional control valve that is assigned to the other brake circuit and is also developed as a sliding valve, the output pressure of said second proportional control valve being utilized for the buildup of brake pressure in the second brake circuit, said second proportional control valve having an emergency piston that, in the case of a breakdown of the separate power sources, can be shifted only by means of pedal force to cause the buildup of a pressure in an output pressure space that is proportional to the pedal travel, wherein a piston arrangement is provided in a main bore of a brake-power booster unit housing between the emergency piston and an end front wall of the housing on the side of the pedal, said piston arrangement comprising an outer ring piston that is sealed off with respect to the main bore and a central auxiliary piston arranged to slide in a pressure-sealed manner in said outer ring piston, said piston arrangement, on the one side, together with the emergency piston delimiting a first working pressure space into which the output pressure of the second proportional control valve can be coupled to act on the whole cross-sectional surface of the main bore on the emergency piston, said piston arrangement on the other side, together with the end front wall of the booster housing on the side of the pedal, delimiting a second working pressure space into which the output pressure of the first proportional control valve can be coupled, to act upon on an overall surface of the ring piston and of the auxiliary piston corresponding to the cross-sectional surface of the main bore, wherein a slider of the second proportional control valve is developed as an essentially rod-shaped extension of the auxiliary piston arranged to slide in a central valve bore of the emergency piston, said section extending between a central piston flange sealed off with respect to the main bore and a piston flange of the emergency piston, delimiting the additional working space on one side, said flanges axially delimiting the input pressure space of the second proportional control valve connected to the power source, wherein a pressure rod part movably coupled with the brake pedal is arranged to slide in a pressure-sealed manner in a central bore of the end front wall of the booster housing, wherein for a drop in pressure in the second working pressure space said pressure rod part is supported directly at the auxiliary piston and, via said auxiliary piston at the emergency piston, wherein a path transducer is provided that generates an electrical output signal that is characteristic for the position of the emergency piston, and a pressure transducer is provided that generates an actual pressure value signal that is characteristic for the pressure in the output pressure space of the brake-power booster unit, and wherein a comparison arrangement is provided that generates a warning signal when the actual value of the pressure at the output of the brake-power booster unit is lower than a desired value of the output pressure to be expected according to the position of the emergency piston.

2. A hydraulic brake-power booster unit according to claim 1, wherein a reversing valve is provided that, takes up its normal position in which the brake fluid storage tank of the brake system is connected with an anti-cavitation space as long as the shifting path of the emergency piston is smaller than a minimum value, in the normal position of the emergency piston, brake fluid can flow between the output pressure space and anti-cavitation space, and that, the reversing valve is directed into an alternate flow-through position in which pressure from the pressure supply unit assigned to one brake circuit can be coupled into the output pressure space of the brake-power booster unit when the emergency piston has covered a minimum path in the sense of a reduction of the volume of the output pressure space, in which case, the output pressure space is blocked with respect to the anti-cavitation space.

3. A hydraulic brake-power booster unit according to claim 2, wherein in the alternate flow-through position of the reversing valve, the output of the pressure supply sub-unit of the brake circuit is connected to the anti-cavitation space.

4. A hydraulic brake-power booster unit according to claim 2, wherein the reversing valve can be actuated against an elastic restoring force mechanically via a tappet that is guided so that it can be slid in the housing of the brake-power booster unit in a pressure-sealed manner and that supports itself at its free end radially at a conical surface of the emergency piston that extends between the flanges of the emergency piston that axially delimit the anti-cavitation space.

5. An hydraulic brake-power booster unit for a vehicle having an antilocking system, comprising:
   brake power booster housing means;
   piston means positioned within a bore of said brake power booster housing means and delimiting on one side an output pressure space which is connected to a brake circuit;
   brake pedal actuating means for hydraulically actuating said piston means;
   switching means for supplementing the output pressure at certain predetermined positions of said piston means;
   position monitor means for monitoring the position of said piston means and generating a position signal;
   output actual pressure monitor means for monitoring said output pressure and generating a pressure signal; and
   comparison means for comparing said actual pressure signal and a desired pressure signal derived from said position signal and generating a warning signal when the actual pressure signal is less than the desired pressure signal.

6. A booster unit according to claim 5, wherein said position output pressure monitor means generate electrical signals corresponding to the respective position and pressure and send said signals to the comparison means.

7. A booster unit according to claim 6, wherein at a predetermined position of said piston means, corresponding to normal braking conditions, the switching means provides fluid from a reservoir to the output pressure space means.

8. A booster unit according to claim 6, wherein at a predetermined position of said piston means, said switching means provides fluid from a pressure supply source to the output pressure space means to supplement the output.

* * * * *